United States Patent
Ikemiya et al.

(10) Patent No.: US 12,108,003 B2
(45) Date of Patent: Oct. 1, 2024

(54) IMAGE READING APPARATUS AND CONTROL METHOD THEREOF FOR DETERMINING PRESENCE OR ABSENCE OF A DOCUMENT

(71) Applicant: CANON KABUSHIKI KAISHA, Tokyo (JP)

(72) Inventors: Keisuke Ikemiya, Kanagawa (JP); Norikazu Honda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/450,276

(22) Filed: Aug. 15, 2023

(65) Prior Publication Data
US 2023/0396721 A1    Dec. 7, 2023

Related U.S. Application Data

(63) Continuation of application No. PCT/JP2022/004989, filed on Feb. 9, 2022.

(30) Foreign Application Priority Data

Feb. 17, 2021   (JP) .................................. 2021-023545

(51) Int. Cl.
*H04N 1/00* (2006.01)
*H04N 1/03* (2006.01)

(52) U.S. Cl.
CPC ..... *H04N 1/00774* (2013.01); *H04N 1/00689* (2013.01); *H04N 1/00692* (2013.01);
(Continued)

(58) Field of Classification Search
CPC ........... H04N 1/00689; H04N 1/00692; H04N 1/00708; H04N 1/00734; H04N 1/00737;
(Continued)

(56) References Cited

U.S. PATENT DOCUMENTS

2007/0097908 A1   5/2007  Khandekar et al.
2017/0034386 A1*  2/2017  Kusuhata ................. H04N 1/10
(Continued)

FOREIGN PATENT DOCUMENTS

JP    2004126132 A    4/2004
JP    2006067329 A    3/2006
(Continued)

*Primary Examiner* — Chad Dickerson
(74) *Attorney, Agent, or Firm* — Canon U.S.A., Inc. IP Division

(57) ABSTRACT

An image reading apparatus includes a document table, a pressing plate that rotates about a rotation axis between an open position and a closed position, a line sensor that includes an image sensor arranged in a main scanning direction intersecting the rotation axis and outputs data by reading a document on the document table, and a control unit that determines presence or absence of the document based on first data acquired by the line sensor when the pressing plate is in an intermediate position before reaching the closed position and second data acquired by the line sensor when the pressing plate is in the closed position, wherein when the control unit determines the presence or absence of the document based on the first data and the second data, the control unit uses coefficient data that is smaller as a distance from the rotation axis is longer.

12 Claims, 9 Drawing Sheets

(52) U.S. Cl.
CPC ..... *H04N 1/00708* (2013.01); *H04N 1/00734* (2013.01); *H04N 1/03* (2013.01)

(58) Field of Classification Search
CPC ........ H04N 1/00774; H04N 1/03; H04N 1/04; G03B 27/62; G03G 15/00; G06T 1/00
USPC ....... 358/1.11–1.18, 496–498, 488; 399/380, 399/379
See application file for complete search history.

(56) References Cited

U.S. PATENT DOCUMENTS

| | | | |
|---|---|---|---|
| 2018/0288237 A1* | 10/2018 | Akagi | ................ H04N 1/00713 |
| 2019/0281179 A1 | 9/2019 | Hosogoshi et al. | |
| 2021/0168254 A1* | 6/2021 | Shimizu | ............. H04N 1/00713 |

FOREIGN PATENT DOCUMENTS

| | | | | |
|---|---|---|---|---|
| JP | 2006067330 A | | | 3/2006 |
| JP | 2008107610 A | | * | 5/2008 |
| JP | 2013219780 A | | | 10/2013 |
| JP | 2017034392 A | | | 2/2017 |
| JP | 2019161321 A | | | 9/2019 |

* cited by examiner

FIG.3

| PRESSING PLATE POSITION | FIRST PHOTO INTERRUPTER | SECOND PHOTO INTERRUPTER |
|---|---|---|
| OPEN POSITION | L | L |
| INTERMEDIATE POSITION | H | L |
| CLOSED POSITION | H | H |

IMAGE READING APPARATUS AND CONTROL METHOD THEREOF FOR DETERMINING PRESENCE OR ABSENCE OF A DOCUMENT

CROSS-REFERENCE TO RELATED APPLICATIONS

This application is a Continuation of International Patent Application No. PCT/JP2022/004989, filed Feb. 9, 2022, which claims the benefit of Japanese Patent Application No. 2021-023545, filed Feb. 17, 2021, both of which are hereby incorporated by reference herein in their entirety.

BACKGROUND OF THE INVENTION

Field of the Invention

The present invention relates to an image reading apparatus and a control method thereof.

Background Art

There is known an image reading apparatus that reads a document placed on a document table using a line sensor in a state where a pressing plate is closed, and the image reading apparatus can also detect the size of the document placed on the document table. Japanese Patent Application Laid-Open No. 2013-219780 discusses that data is acquired using a line sensor at different open/closed positions when a pressing plate is closed, and the size of a document is determined by comparing the acquired data and a predetermined threshold.

CITATION LIST

Patent Literature

PTL 1: Japanese Patent Application Laid-Open No. 2013-219780

SUMMARY OF THE INVENTION

According to an aspect of the present invention, an image reading apparatus includes a document table on which a document is placed, a pressing plate configured to rotate about a rotation axis between an open position where the document table is uncovered and a closed position where the document table is covered, a line sensor including an image sensor arranged in a main scanning direction intersecting the rotation axis and configured to output data by reading the document placed on the document table, and a control unit configured to determine presence or absence of the document based on first data acquired by the line sensor when the pressing plate is in an intermediate position before reaching the closed position and second data acquired by the line sensor when the pressing plate is in the closed position, wherein when the control unit determines the presence or absence of the document based on the first data and the second data, the control unit uses coefficient data that is smaller as a distance from the rotation axis is longer.

Further features of the present invention will become apparent from the following description of exemplary embodiments with reference to the attached drawings.

BRIEF DESCRIPTION OF THE DRAWINGS

FIG. 3 is a diagram illustrating a relationship between the open/closed position of the pressing plate and outputs of photo interrupters.

DESCRIPTION OF THE EMBODIMENTS

Figure 1:
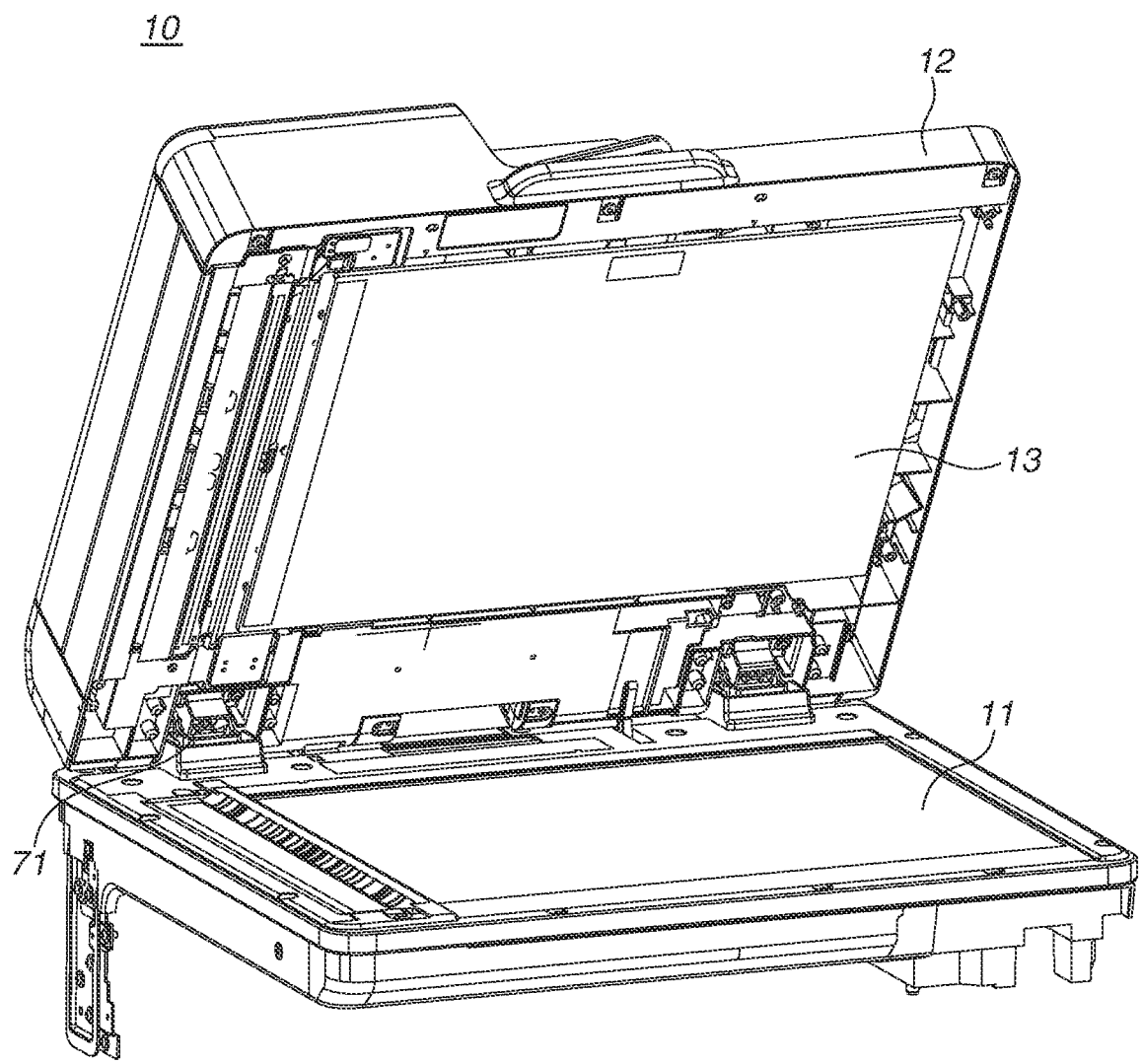
FIG. 1 is a perspective view illustrating an appearance of a scanner unit.

Exemplary embodiments of the present invention will be described below with reference to the drawings. The exemplary embodiments described below are not intended to limit the present invention, and not all of combinations of features described in the exemplary embodiments are necessarily required for a solution of the present invention. The same configurations will be denoted by the same reference numerals and described. Relative placements, shapes, and the like of components described in the exemplary embodiments are merely examples, and are not intended to limit the scope of this invention thereto. Therefore, the present invention can be implemented in various other embodiments, and various omissions, replacements, combinations, and modifications can be made without departing from the gist of the invention.

First Exemplary Embodiment

In a first exemplary embodiment, a configuration of a multi-functional peripheral (MFP) including an image reading apparatus and a print apparatus will be described. This MFP is not limited to a specific print method, and any of an electrophotographic method, an inkjet method, and a thermal transfer method may be used.

Scanner Unit

Here, a case where the image reading apparatus is a scanner unit 10 disposed in an upper part of the main body of the MFP will be described. FIG. 1 is a perspective view illustrating an appearance of the scanner unit 10. The scanner unit 10 includes a document table 11 where a document is placed. The document is placed by a user so that a document surface faces the document table 11. A pressing plate 12 for pressing the document placed on the document table 11 is rotatably disposed above the document table 11. The pressing plate 12 can rotate about a rotation axis of a hinge portion 71 with respect to the document table 11 between an open position where the document table 11 is uncovered and a closed position where the document table 11 is covered. A white plate 13 having a color close to a white color is attached to a document pressing surface of the pressing plate 12.

Figure 2A:
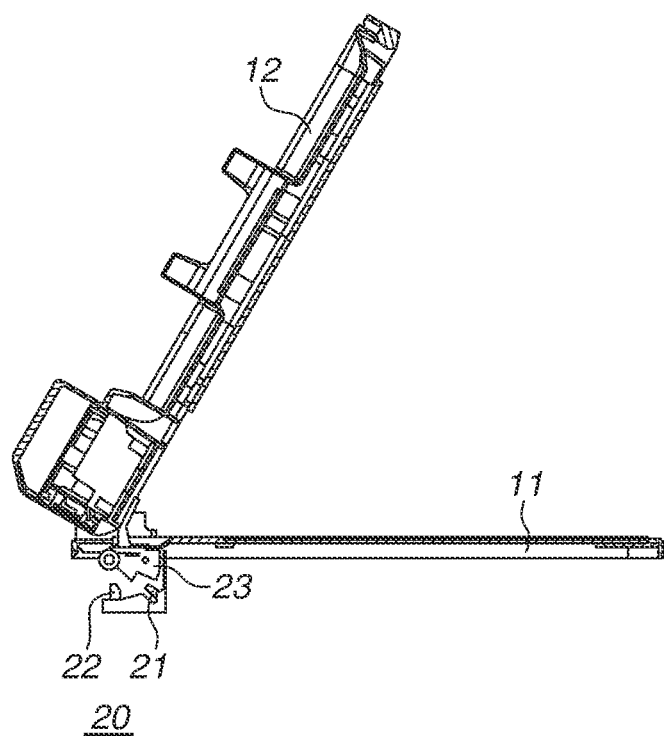
FIG. 2A is a diagram illustrating a relationship between an open/closed position of a pressing plate and a position detection sensor.
Figure 2B:
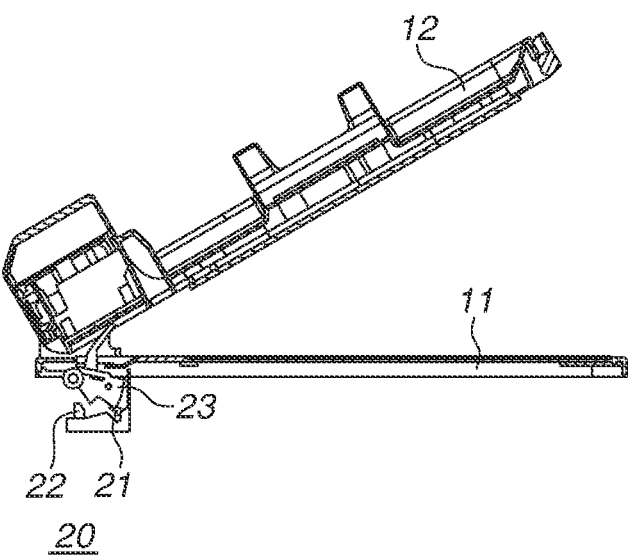
FIG. 2B is a diagram illustrating the relationship between the open/closed position of the pressing plate and the position detection sensor.
Figure 2C:
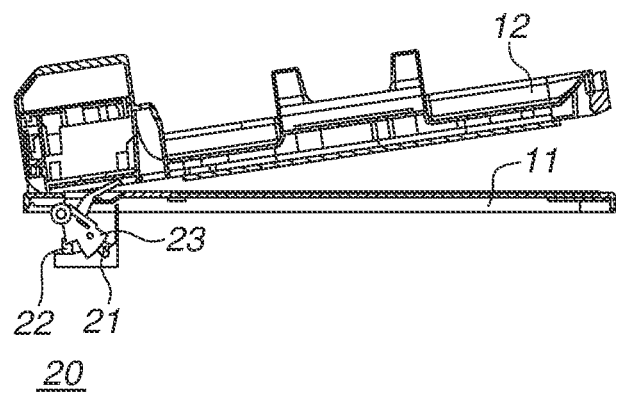
FIG. 2C is a diagram illustrating the relationship between the open/closed position of the pressing plate and the position detection sensor.

FIG. 2A to FIG. 2C are diagrams illustrating the relationship between an open/closed position of the pressing plate and a position detection sensor. FIG. 3 is a diagram illustrating the relationship of an output of a photo interrupter with respect to the open/closed position of the pressing plate 12. The pressing plate 12 is provided with a position detection sensor 20 for detecting the open/closed position of the pressing plate 12. The position detection sensor 20 includes a first photo interrupter 21, a second photo interrupter 22, and a shutter portion 23. The first photo interrupter 21 and the second photo interrupter 22 each includes a light receiving element and a light emitting element. The shutter portion 23 rotates with the open/close operation of the pressing plate 12, and can shield the first photo interrupter 21 or the second photo interrupter 22 based on the open/closed position of the pressing plate 12. The photo interrupters each outputs a L-level that is a low output in a state where the light receiving element can receive light from the light emitting element, and outputs a H-level that is a high output in a state where the light receiving element cannot receive light from the light emitting element. The photo interrupters each can detect the open position in which the pressing plate 12 does not cover the document table 11, the closed position in which the pressing plate 12 covers the document table 11, and an intermediate position between the open position and the closed position. The position detection sensor 20 may be an encoder disposed in the rotation axis. In the case of the encoder, the open/closed position of the pressing plate 12 can be acquired more precisely.

FIG. 2A illustrates the relationship between the photo interrupters and the shutter portion 23 when the pressing plate 12 is in the open position. The light receiving element of each of the first photo interrupter 21 and the second photo interrupter 22 is in a state where light from the light emitting element can be received. Therefore, the output of the first photo interrupter 21 and the output of the second photo interrupter 22 are the L-level. FIG. 2B illustrates the relationship between the photo interrupters and the shutter portion 23 when the pressing plate 12 is in the intermediate position. The light receiving element of the first photo interrupter 21 is in a state of being shielded by the shutter portion 23, and unable to receive light from the light emitting element, and the light receiving element of the second photo interrupter 22 is in a state of being able to receive light. Therefore, the output of the first photo interrupter 21 is the H-level, and the output of the second photo interrupter 22 is the L-level. The intermediate position is a position in which an angle formed by the pressing plate 12 and the document table 11 is, for example, 30 degrees. FIG. 2C illustrates the relationship between the photo interrupters and the shutter portion 23 when the pressing plate 12 is in the closed position. The light receiving element of each of the first photo interrupter 21 and the second photo interrupter 22 is in a state of being shielded by the shutter portion 23, and unable to receive light from the light emitting element. Therefore, the output of the first photo interrupter 21 and the output of the second photo interrupter 22 are the H-level. The closed position is a position in which an angle formed by the pressing plate 12 and the document table 11 is, for example, 5 degrees. The angles of the open position, the intermediate position, and the open position may be other angles if the angles are in this descending order.

Further, the intermediate position may be detected by the photo interrupters, and the open position and closed position may be detected by another sensor.

The accuracy of the detection of the open/closed position of the pressing plate 12 can vary by a few degrees because of the influence of a mechanical error or the like. In addition, the open/closed position of the pressing plate 12 varies depending on the opening/closing speed when the user closes the pressing plate 12. Further, there is also a time lag after the open/closed position of the pressing plate 12 is detected by the position detection sensor 20 and before data from a line sensor is acquired. In the present exemplary embodiment, the presence or absence of a document can also be determined even in a case where the speed of opening/closing the pressing plate 12 varies. As a result, the size of the document is more likely to be accurately determined.

Figure 4:
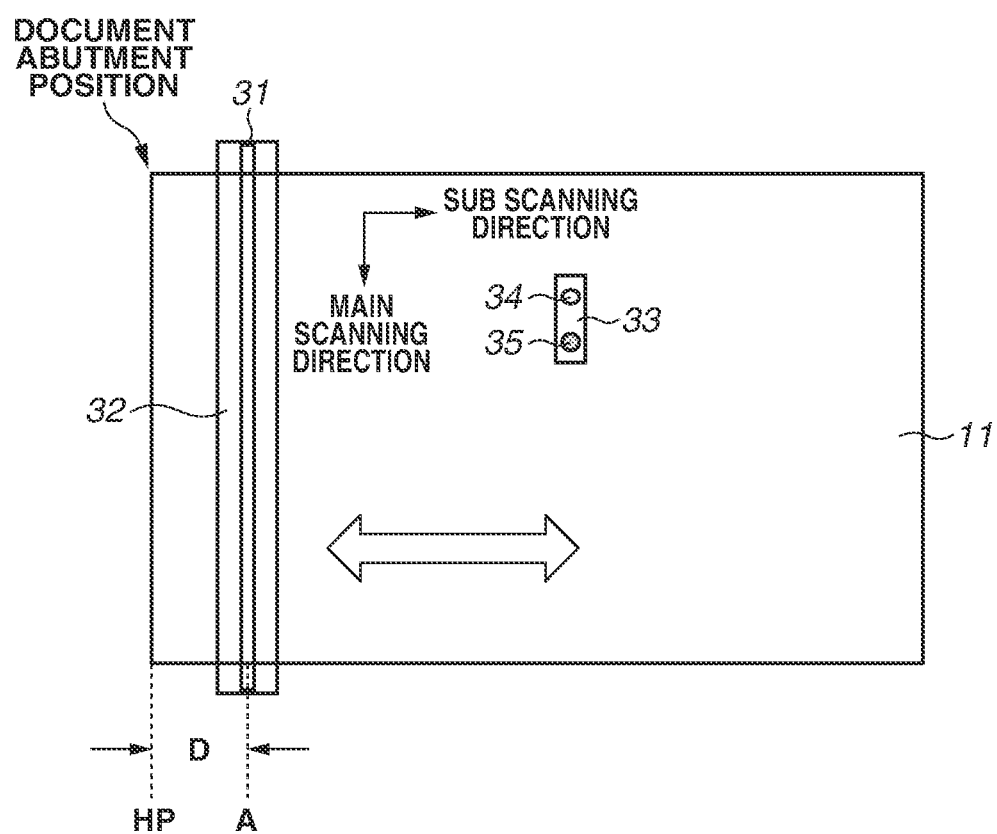
FIG. 4 is a top view illustrating a positional relationship between a document table and a line sensor.

FIG. 4 is a top view illustrating the positional relationship between the document table and the line sensor. A carriage unit 31 is disposed below the document table 11 of the scanner unit 10. The carriage unit 31 is mounted with members such as a light source (light-emitting diode (LED)), a light guide, a lens array, and a line sensor 32, and can optically read an image of a document placed on the document table 11. The line sensor 32 mounted on the carriage unit 31 extends in a main scanning direction that is a direction intersecting the rotation axis. The line sensor 32 outputs data for one line in the main scanning direction of the document, using image sensors arranged in the main scanning direction. The data is, for example, in the form of an array for every one line. The document can be read by acquiring image data by subjecting the output data to image processing. In the present exemplary embodiment, a contact optical system using a contact image sensor (CIS) is used, but other methods such as a reduction optical system may be used. Further, the main scanning direction may be parallel with the rotation axis.

The carriage unit 31 includes a movement mechanism that moves in a sub scanning direction intersecting the main scanning direction. The carriage unit 31 is on standby at a home position (HP) in a standby state. After the document is placed on the document table 11 by the user using a document abutment position as a reference, various operations are executed based on an instruction of the user. In a document size detection operation for determining the size of the document, the carriage unit 31 moves from the home position to a predetermined position A located at a distance D in the sub scanning direction. In a document reading operation for reading an image of the document, the carriage unit 31 can continuously acquire the output data of each line in the main scanning direction of the document while moving from the home position in the sub scanning direction. The carriage unit 31 moves to an end of the document in the sub scanning direction, and the acquired output data is subjected to the image processing, so that the document as a whole can be read as image data.

A reflection-type photo sensor 33 is a sensor that detects the presence or absence of a document in the sub scanning direction. The reflection-type photo sensor 33 includes a light emitting portion 34 and a light receiving portion 35, and light emitted from the light emitting portion 34 and then reflected by the document is received by the light receiving portion 35. The light receiving portion 35 outputs a voltage according to the amount of the received light. When the pressing plate 12 is in the intermediate position and the closed position, light emitted from the light emitting portion 34 is acquired by the light receiving portion 35. When the pressing plate 12 is in the intermediate position and the closed position, it is determined that a document is absent when there is a change in the light acquired by the light receiving portion 35, whereas it is determined that a document is present when there is no such a change. In the present exemplary embodiment, the reflection-type photo sensor is used, but it is not limited to a specific method if the presence or absence of a document can be detected.

Figure 5:
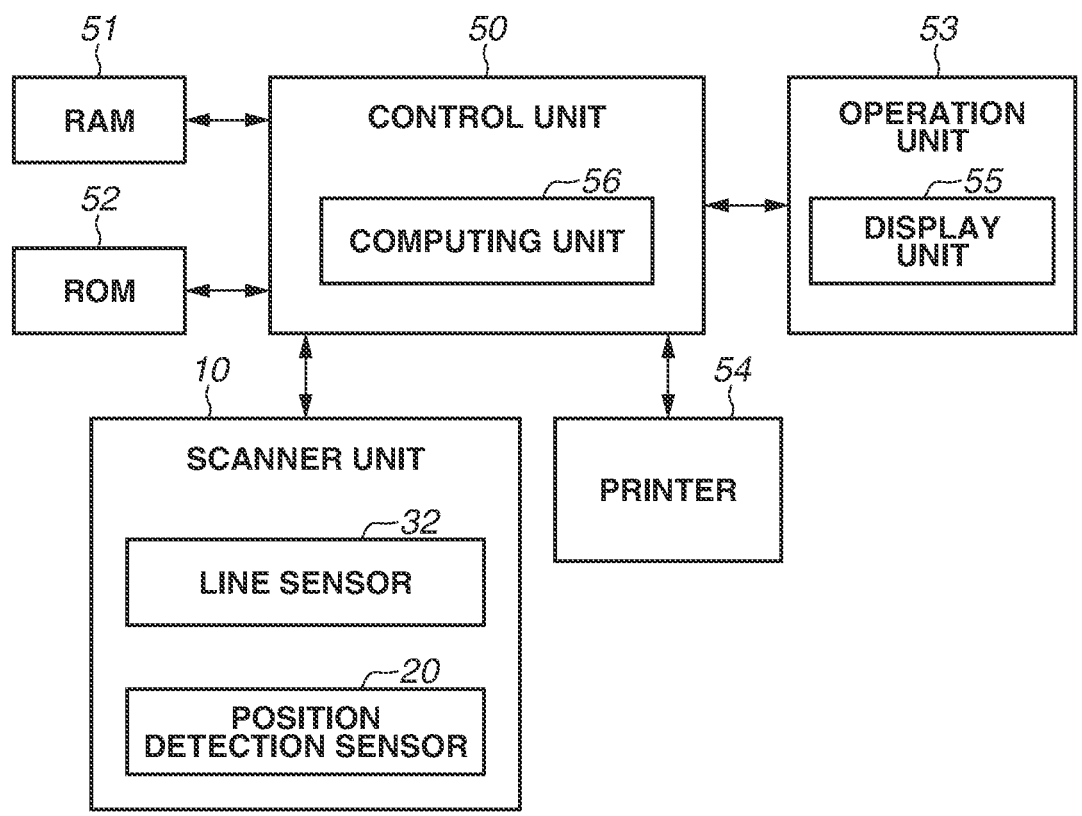
FIG. 5 is a system block diagram illustrating a multi-function peripheral (MFP).

FIG. 5 is a system block diagram illustrating the MFP. A control unit 50 controls a printer 54 or the scanner unit 10 based on an instruction from an operation unit 53 or an external control apparatus (not illustrated). A RAM 51 holds parameters necessary for the control of the scanner unit 10 or the printer 54. A ROM 52 holds a program for executing document reading operation, image printing operation, and document size detection operation. Further, the ROM 52 holds a document size reference table for determining a document size, and coefficient data used for calculating threshold data to determine the presence or absence of a document. The control unit 50 executes various kinds of control based on the parameters held in the RAM 51. In addition, the control unit 50 includes a computing unit 56 for calculating the threshold data to determine the presence or absence of a document. The operation unit 53 includes various buttons, and the user can manually perform any operation. A display unit 55 is a touch panel, and the user can confirm information notified by the display unit 55, and perform any operation.

In a case where a read document is to be recorded on a recording medium, the user places the document on the document table 11 of the scanner unit 10. When a start button of the operation unit 53 is pressed, output data from the line sensor is acquired by the scanner unit 10. The acquired output data is subjected to image processing in the control unit 50, and the document is read as image data. The image processing includes shading correction for correcting variations in sensitivity of the line sensor. Subsequently, the image data is output to the printer 54, and the image is recorded on the recording medium.

Document Size Detection Operation

Here, the document size detection operation for detecting the size of a document placed on the document table 11 will be described. After the presence or absence of a document is determined in the main scanning direction and the sub scanning direction, the size of the document is determined from the result of determining the presence or absence of the document and the document size reference table.

Figure 6:
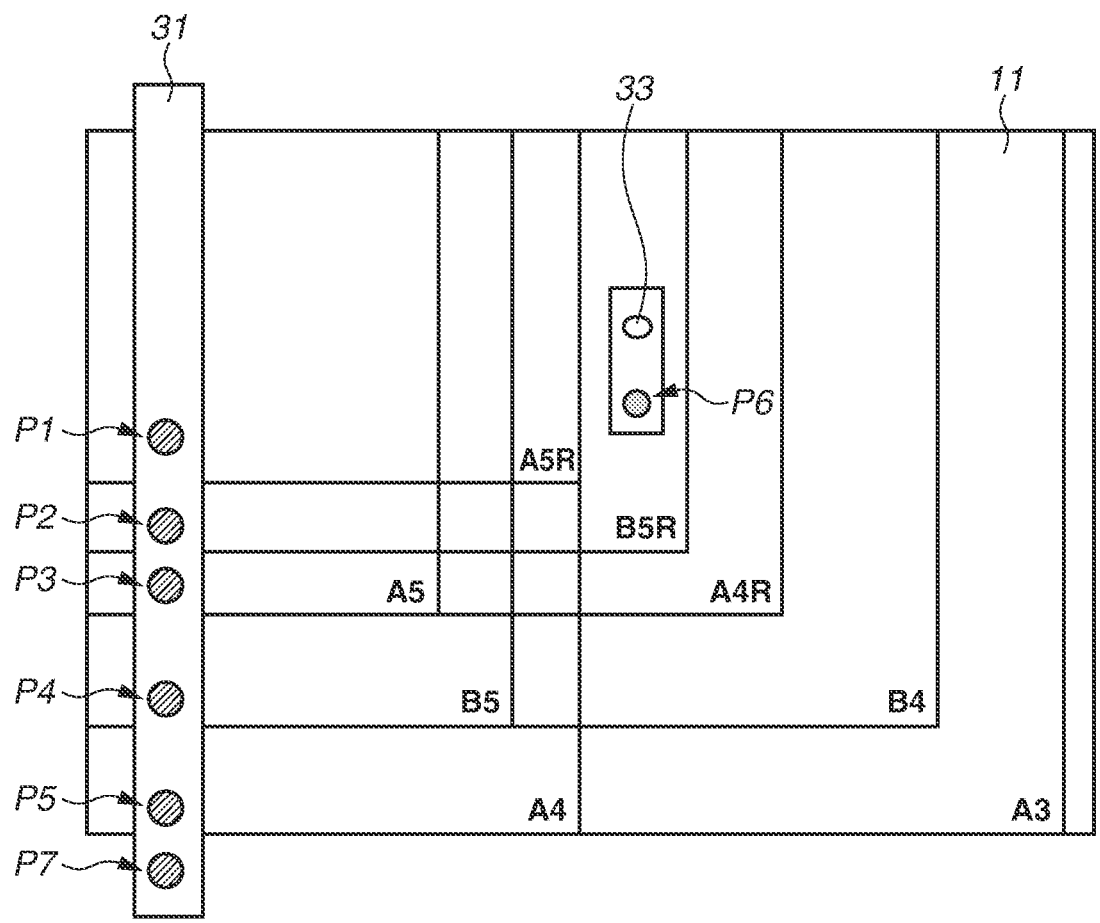
FIG. 6 is a schematic diagram illustrating a relationship between a document size and a detection position.

FIG. 6 is a schematic diagram illustrating the relationship between a document size and a detection position for detecting the presence or absence of a document. In the line sensor 32, there is a plurality of detection positions P1 to P5 and P7. The detection positions P1 to P5 and P7 each indicate a detection position depending on the size of a document in the main scanning direction of the line sensor 32. The relationship between the detection position and the document size is as follows. P1 corresponds to A5R, P2 corresponds to B5R, P3 corresponds to A5 and A4R, P4 corresponds to B5 and B4, and P5 corresponds to A4 and A3. The detection positions P1 to P5 and P7 may each be arranged at the center of a range consisting of a predetermined number of image sensors of the line sensor 32, instead of arranging a single image sensor on each of the detection positions P1 to P5 and P7. A detection position P6 indicates a detection position of the reflection-type photo sensor 33. The presence or absence of a document having a size of B5R or more can be detected based on P6. The detection position P7 is outside an area where a document is placed. In the present exemplary embodiment, the maximum detectable size of a document is the A3 size. Thus, the detection position P7 is a position not overlapping a document even when a document of the A3 size that is the maximum size is placed on the document table 11. The detection position P7 is not necessarily required for the implementation of the present invention.

The size of a document is determined based on the output data from the line sensor 32 and the document size reference table stored in the ROM 52. For example, in a case where the detection results at the detection positions P1 to P3 indicate the presence of a document, the detection results at the detection positions P4, P5, and P7 indicate the absence of a document, and the detection result at the detection position P6 indicates the absence of a document, the control unit 50 can determine A5 as the document size. In a case where the detection results at the detection positions P1 to P3 indicate the presence of a document, the detection results at the detection positions P4, P5, and P7 indicate the absence of a document, and the detection result at the detection position P6 indicates the presence of a document, the control unit 50 can determine A4R as the document size.

The presence or absence of a document in the main scanning direction is determined using the output data from the line sensor 32. When the pressing plate 12 is closed, the control unit 50 acquires the output data from the line sensor 32 in each of a case where the pressing plate 12 is in the intermediate position and a case where the pressing plate 12 is in the closed position. The output data is array data consisting of pieces of data output values of the respective image sensors arranged in a row in the main scanning direction of the line sensor 32. However, in the present exemplary embodiment, output data at a position corresponding to each of the detection positions P1 to P5 and P7 in the output data is used as the output data. At each of the detection positions, the output value of the image sensor may be the average of a plurality of image sensors near each of the detection positions.

The output data from the line sensor 32 changes according to the intensity of light input into the image sensor. An amount of light entering the image sensor upon being reflected by a detection target is greater as the detection target has a color closer to a white color, and the distance between the detection target and the image sensor is shorter. In addition, the output value from the image sensor is larger as the amount of light entering the image sensor is greater. On the other hand, the amount of light entering the image sensor is smaller as the detection target has a color closer to a black color, and the distance between the detection target and the image sensor is longer, or when where is no detection target. In this case, the output value from the image sensor is small. The difference between data with the LED on that is acquired when the LED of the carriage unit 31 is turned on and data with the LED off that is acquired when the LED is turned off in the document size detection operation may be used as new output data. The influence of external light can be canceled by this output data.

The output data obtained from the line sensor 32 when the pressing plate 12 is in the intermediate position where the pressing plate 12 is not completely closed is used as reference data for calculating the threshold data for determining the presence or absence of a document. Using the reference data and the coefficient data stored beforehand in the ROM 52, the computing unit 56 calculates the threshold data for determining the presence or absence of a document. The coefficient data consists of values set for the respective detection positions of the line sensor 32. The coefficient data consists of values that are monotonically larger (may include equal values in part) as the distance from the hinge portion 71 is longer in the main scanning direction because the pressing plate 12 is in the intermediate position. In a case where the output is to be reversed, the coefficient data may consist of values that are monotonically smaller (may include equal values in part) as the distance from the hinge portion 71 is longer in the main scanning direction. In the present exemplary embodiment, the threshold data is calculated by multiplying the reference data by the coefficient data. However, the computation method may be addition, or may be the combination of addition and multiplication. The coefficient data may be calculated from designed values or the like, may be factory-adjusted values, or may be values adjusted by a service staff at the time of installation.

The output data at the closed position that is obtained from the line sensor 32 when the pressing plate 12 is in the closed position is used to determine the presence or absence of a document. Specifically, the output data at the closed position and the threshold data are compared. It is determined that a document is absent if [output value at closed position>threshold], and it is determined that a document is present if [output value at closed position≤threshold], at the detection positions (P1 to P5). In the computation according to the present exemplary embodiment, threshold level shading processing is unnecessary because the threshold is not a fixed threshold and is calculated for every computation. The threshold level shading processing is processing for adjusting the threshold data for determining the presence or absence of a document for each individual line sensor, in order to correct sensitivity variations and the like between line sensors 32. In other words, it is necessary to execute the threshold level shading processing in a conventional method using a threshold set beforehand.

Figure 7A:
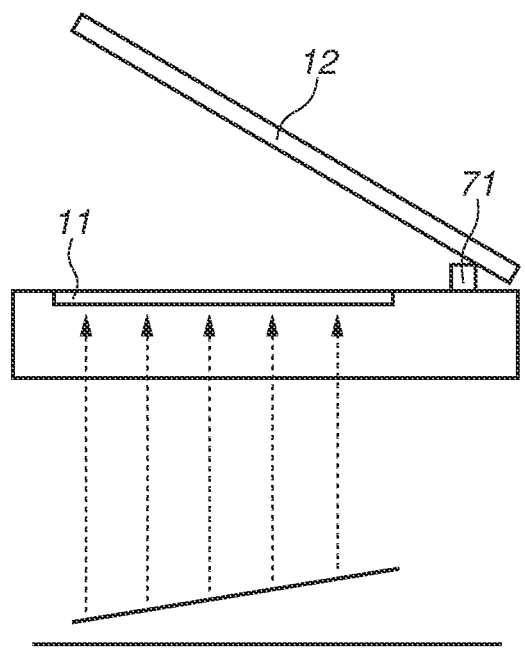
FIG. 7A is a diagram illustrating output data from the line sensor when a white document is not placed.
Figure 7B:
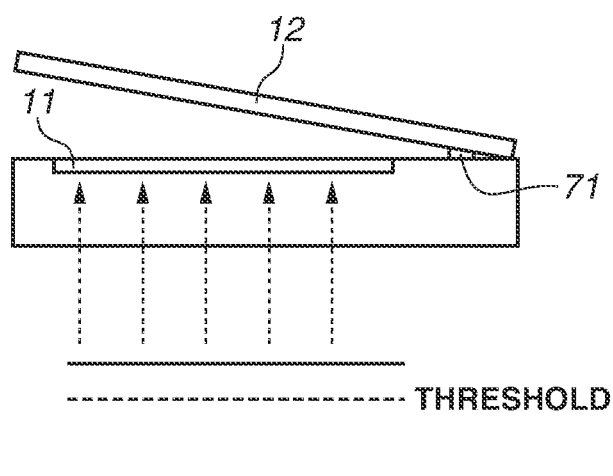
FIG. 7B is a diagram illustrating output data from the line sensor when a white document is not placed.
Figure 8A:
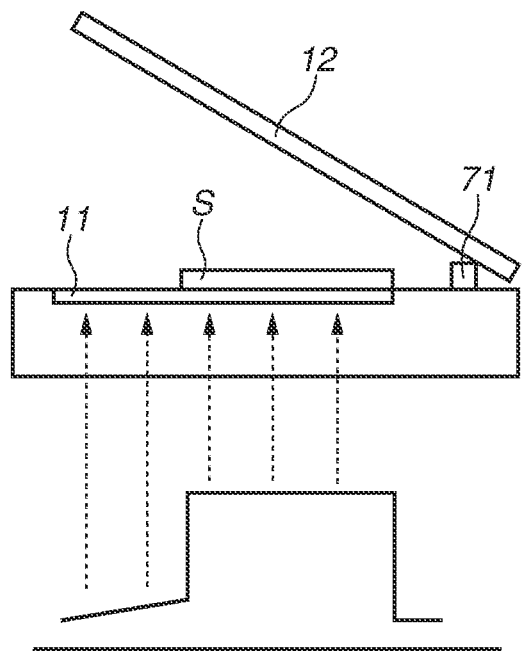
FIG. 8A is a diagram illustrating output data from the line sensor when a white document is placed.
Figure 8B:
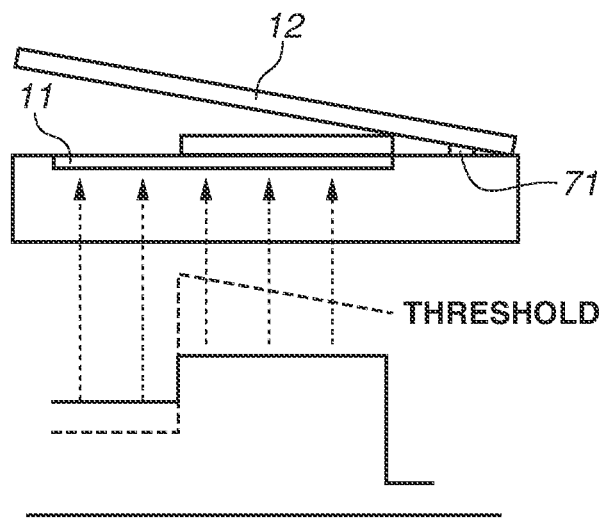
FIG. 8B is a diagram illustrating output data from the line sensor when a white document is placed.

Here, the output data from the line sensor 32 will be described in detail. FIG. 7A and FIG. 7B are diagrams illustrating the output data from the line sensor 32 when a white document is not placed on the document table 11. FIG. 8A and FIG. 8B are diagrams illustrating the output data from the line sensor 32 when a white document is placed on the document table 11. Arrows indicate the detection positions (P1 to P5) of the line sensor 32 in the main scanning direction and the detection positions correspond to the document size. FIG. 7A and FIG. 8A each illustrate a case where the pressing plate 12 is in the intermediate position, and FIG. 7B and FIG. 8B each illustrate a case where the pressing plate 12 is in the closed position. Solid lines indicate the output data from the line sensor 32, and dotted lines indicate the threshold data for determining the presence or absence of a document, which is computed from the output data when the pressing plate 12 is in the intermediate position.

In the output data in FIG. 7A, the output value at a position that is closer to the hinge portion 71 and is located at a shorter distance to the white plate 13 is higher, because the pressing plate 12 slopes in the intermediate position. On the other hand, the output value at a position that is farther away from the hinge portion 71 and is located at a longer distance to the white plate 13 is lower. The output data at the intermediate position is used as the reference data. In FIG. 7B, because the distance between the white plate 13 and the line sensor 32 is short, the output data is uniform. The threshold data for determining the presence or absence of a document is calculated from the reference data acquired at the intermediate position and the coefficient data as described above. As the threshold data, a predetermined magnification is set lower for a position closer to the hinge portion 71, and is set higher for a position farther away from the hinge portion 71. The threshold data for determining the presence or absence of a document can be thereby made uniform. Since the output data is higher than the threshold data, it is determined that a document is absent.

In the output data in FIG. 8A, the output value in a part where a white document S is placed is high. On the other hand, the output value in a part where the white document S is not placed is low. However, in the part where the white document S is not placed, the output value at a position closer to the hinge portion 71 and located at a shorter distance to the white plate 13 is higher, because the pressing plate 12 slopes in the intermediate position. The output data acquired at the intermediate position is used as the reference data. In FIG. 8B, because the distance between the white plate 13 and the line sensor 32 is short, the output data is high not only in the part where the white document S is placed but also in the part where the white document S is not placed. Whether a document is present or absent at the detection position can be determined based on the threshold data indicated by the dotted line, which is calculated from the reference data and the coefficient data. It is determined that a document is absent for a position at which the output data is higher than the threshold data.

In a case where the speed of opening/closing the pressing plate 12 by the user is fast, the pressing plate 12 is closer to the closed position than to the intermediate position, and thus the output data from the line sensor 32 is high. Thus, in a conventional document size detection operation in which an absolute threshold set beforehand is referenced, there is a case where a document size is falsely detected. In the present exemplary embodiment, the threshold data for determining the presence or absence of a document is computed every time. Even if the open/closed position of the pressing plate 12 is different from the assumption, false detection of the presence or absence of a document can be prevented because the threshold data is calculated based on the open/closed position of the pressing plate 12.

For a recording medium having high transmittance such as tracing paper, the difference between the output value from the image sensor in a part where a document is present and the output value from the image sensor in a part where a document is not present is small, and false detection easily occurs. Thus, in a case of using a recording medium having high transmittance such as tracing paper, the numerical value of the coefficient data is adjusted so as to correctly determine that a document is present, thereby making it possible to detect the document size irrespective of the type of a recording medium. The coefficient data may be set depending on the type of a recording medium used for a document.

The presence or absence of a document in the sub scanning direction is determined using the reflection-type photo sensor 33. If the position detection sensor 20 detects that the pressing plate 12 is in the intermediate position, the control unit 50 starts to acquire the output value from the reflection-type photo sensor 33. The acquisition of the output value is continually performed at predetermined time intervals until the position detection sensor 20 detects that the pressing plate 12 is in the closed position. At this time, the first output value is referred to as a sub scanning reference. In a case where the sub scanning reference indicates the presence of a document, and the subsequent detection result remains unchanged from the presence of a document, it is determined that a document is present. In a case where the sub scanning reference indicates the absence of a document, and the subsequent detection result changes to the presence of a document, it is determined that a document is absent.

In the present exemplary embodiment, new hardware to be added to a conventional technique is not necessary. Therefore, it may be determined whether a document is present or absent based on predetermined threshold data stored in the RAM 51, without omitting the threshold level shading processing operation. This makes it also possible to switch between the document size detection operation according to the present invention and the conventional document size detection operation. This is to enable a detection result with higher accuracy to be used depending on the document type or the like.

In this way, the document size can be determined by combining the result of detecting the presence or absence of a document in the main scanning direction by the line sensor 32 mounted on the carriage unit 31 and the result of detecting the presence or absence of a document by the reflection-type photo sensor 33.

Figure 9:
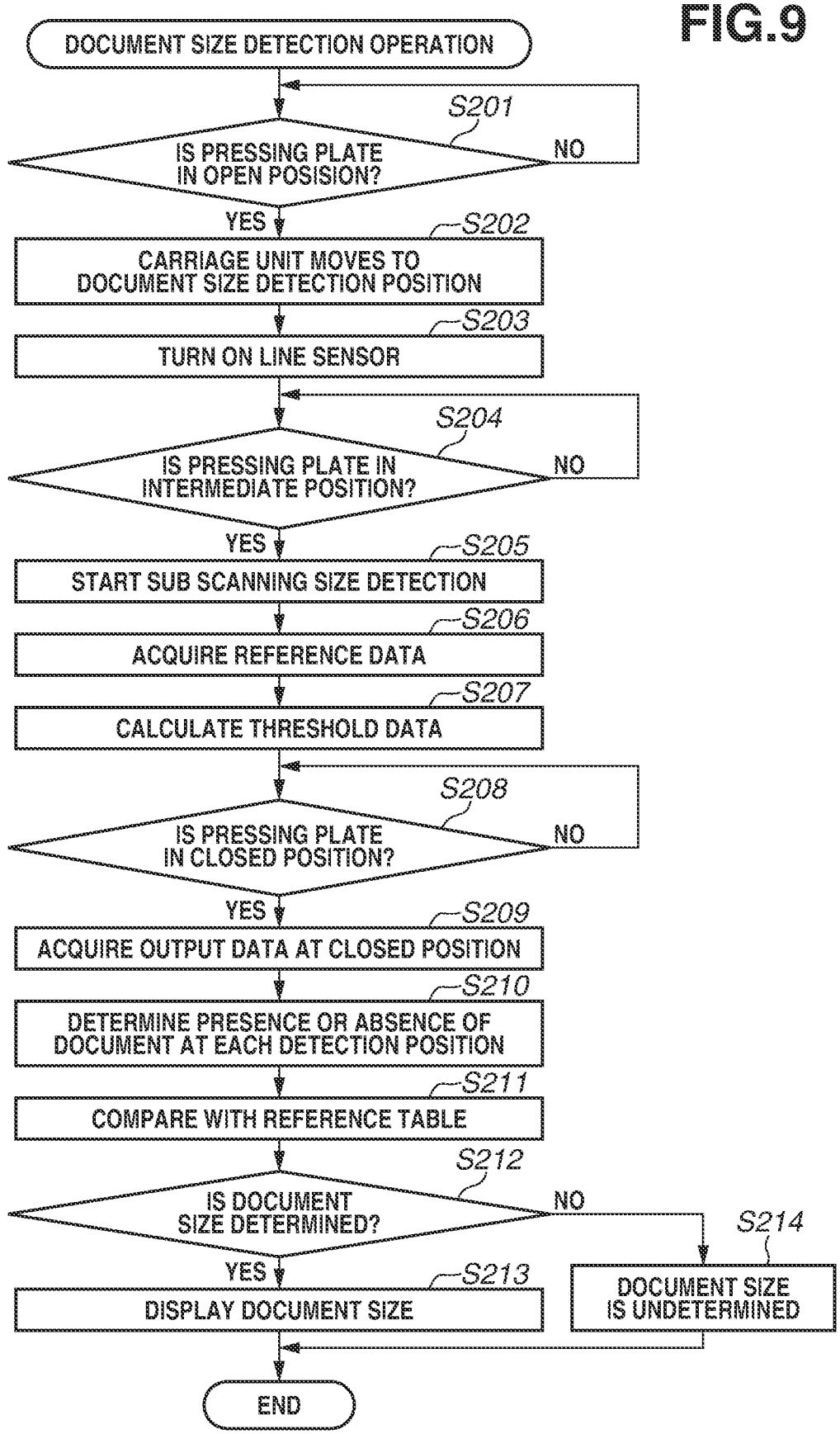
FIG. 9 is a flowchart relating to document size detection operation.

Here, the above-described document size detection operation will be described with reference to a flowchart in FIG. 9.

In step S201, the position detection sensor 20 continuously detects the open/closed position of the pressing plate 12. When the user opens the pressing plate 12, and the position detection sensor 20 detects that the pressing plate 12 is the open position (YES in S201), the processing proceeds to step S202.

In step S202, the carriage unit 31 at the home position (HP) moves in the sub scanning direction to the position A where the document size detection operation is performed.

In step S203, the control unit 50 turns on the line sensor 32, thereby bringing the line sensor 32 into a state where the line sensor 32 can perform document size detection.

In step S204, when the position detection sensor 20 detects that the pressing plate 12 is in the intermediate position (e.g., the state in FIG. 8A) (YES in step S204), the processing proceeds to step S205. This process in step S204 continues until the position detection sensor 20 detects the intermediate position.

In step S205, the reflection-type photo sensor 33 starts the document size detection operation in the sub scanning direction.

In step S206, the control unit 50 causes the line sensor 32 to execute the document reading operation, and acquires the output data to be used as the reference data from the line sensor 32. The reference data is temporarily stored into the RAM 51.

In step S207, the computing unit 56 calculates the threshold data for detecting a document, from the reference data and the coefficient data.

In step S208, when the position detection sensor 20 detects that the pressing plate 12 is in the closed position (YES in step S208), the processing proceeds to step S209. This process in step S208 continues until the position detection sensor 20 detects the closed position.

In step S209, the control unit 50 causes the line sensor 32 to execute the document reading operation, and acquires the output data at the closed position from the line sensor 32.

In step S210, the control unit 50 determines the presence or absence of a document at each detection position, from the data acquired at each detection position in the main scanning direction and the sub scanning direction.

In step S211, the control unit 50 compares the result of determining the presence or absence of a document at each detection position with the document size reference table to determine the document size.

In step S212, the control unit 50 determines whether the document size is successfully determined. When the document size is successfully determined (YES in step S212), the processing proceeds to step S213. When the document size is not successfully determined (NO in step S212), the processing proceeds to step S214.

In step S213, the control unit 50 displays the determined document size on the display unit 55, and notifies the user of the result of detecting the document size.

In step S214, the control unit 50 displays on the display unit 55 that the document size is unsuccessfully determined. In this case, the control unit 50 may further display a message to prompt the user to select a document size. This completes the document size detection operation.

In the present exemplary embodiment, in the document size detection operation of the image reading apparatus, the output data is acquired from the line sensor 32 when the pressing plate 12 is in the intermediate position and in the closed position. The threshold data for determining the presence or absence of a document is calculated from the output data acquired when the pressing plate 12 is in the intermediate position, and the presence or absence of a document in the main scanning direction is detected by comparing the threshold data and the output data acquired when the pressing plate 12 is in the closed position. In this manner, the document size can be determined even in a configuration that is less likely to depend on the speed of opening/closing the pressing plate 12.

Second Exemplary Embodiment

In the first exemplary embodiment, the position detection sensor 20 detects the two positions of the pressing plate 12, i.e., the intermediate position and the closed position. In a second exemplary embodiment, a configuration in which the position detection sensor 20 does not need to detect the closed position will be described. A characteristic part of the second exemplary embodiment will be mainly described, and description of a part overlapping the first exemplary embodiment will be omitted. As with the first exemplary embodiment, when it is detected that the pressing plate 12 is in the intermediate position, the output data from the line sensor 32 is acquired as the reference data, and the threshold data is calculated. In the second exemplary embodiment, if a predetermined period of time elapses after the position detection sensor detects that the pressing plate 12 is in the intermediate position, it is determined that the pressing plate 12 is in the closed position. In other words, the output data from the line sensor 32 is acquired as the output data at the closed position after a lapse of the predetermined period of time following the detection of the intermediate position. The presence or absence of a document in the main scanning direction is determined from the threshold data and the output data at the closed position, as with the first exemplary embodiment. As a result, the document size of a document placed on the document table 11 can be determined. The predetermined period of time is a time before the pressing plate 12 is completely closed by a user after the position detection sensor 20 detects the closed position, and is a sufficient length of time for this series of operations. For a method of counting the predetermined period of time, a counter function built in the control unit 50 is used. The elapsed time after the position detection sensor 20 detects the intermediate position can be counted using the counter function. As a result, the second photo interrupter 22 for detecting the closed position can be eliminated, and the document size can be detected in a configuration that is less expensive and is less likely to depend on the speed of opening/closing the pressing plate.

In another exemplary embodiment of the second exemplary embodiment, it is determined that the pressing plate 12 is in the closed position using the line sensor 32 and the reflection-type photo sensor 33. First, the output data from the line sensor 32 is acquired as the reference data when the intermediate position is detected by the position detection sensor 20, as with the first exemplary embodiment. The threshold data for determining the presence or absence of a document is calculated from the acquired reference data. After the detection of the intermediate position as well, the output values are acquired at each detection position of the line sensor 32 and from the reflection-type photo sensor 33 at fixed time intervals, and amounts of change in the output values are continuously monitored. The output data of the line sensor 32 when the amounts of change in all the output values are less than or equal to a predetermined amount of change is used as the output data at the closed position, and is compared with the threshold data. As a result, the presence or absence of a document at each detection position can be determined, and the document size of a document placed on the document table 11 can be determined. The time interval is, for example, an interval of 10 msec following the detection of the intermediate position of the pressing plate 12. In a case where the output value is less than or equal to the predetermined amount of change ten times in a row at each detection position, it is determined that the pressing plate 12 is in the closed position. In this case, the document size can be determined after about 100 msec from when the pressing plate 12 is closed. As a result, the user's waiting time can be reduced in an inexpensive configuration.

As still another exemplary embodiment of the second exemplary embodiment, it can be determined that the pressing plate 12 is in the closed position based on the output value at the detection position P7 of the line sensor 32. Even if a document of the A3 size that is the maximum document size is placed, the detection position P7 outside the area where the document is mounted does not overlap the document. Thus, the output value at the detection position P7 continues to change based on the open/closed position of the pressing plate 12 when the pressing plate 12 is closed. The output value stops changing when the pressing plate 12 reaches the closed position. Accordingly, it can be detected that the pressing plate 12 is in the closed position.

Further, it also detected that the pressing plate 12 is in the closed position using the detection positions P1 to P5 of the line sensor 32 and the detection position P6 in the sub scanning direction, without using the detection position P7 of the line sensor 32. For example, when a document of the A4 size is placed on the document table 11, the document overlaps the detection positions P1 to P5, but does not overlap the detection position P6. Thus, at the detection position P6 in the sub scanning direction, the output value continues to change until the pressing plate 12 reaches the closed position. Because the output value stops changing when the pressing plate 12 reaches the closed position, it can be detected that the pressing plate 12 is in the closed position. On the other hand, when a document of the A3 size is placed on the document table 11, the document overlaps all of the detection positions P1 to P5 and P6, and the output values do not change based on the open/closed position of the pressing plate 12. Thus, it may be determined that the pressing plate 12 is in the closed position before the pressing plate 12 is completely closed. The presence or absence of a document can be determined by acquiring the output data as output data at the closed position before the pressing plate 12 reaches the closed position after being in the intermediate position, and comparing the acquired output data with the threshold data. The second photo interrupter 22 for detecting the closed position can be thereby eliminated, and the document size can be detected in a configuration that is less expensive and less likely to depend on the speed of opening/closing the pressing plate.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In a case where a predetermined threshold is used, there is a possibility that a false detection of the size of a document occurs according to a change in the closing speed of the pressing plate. According to the present invention, it can be provided an image reading apparatus that can appropriately determine the size of a document based on data acquired by a line sensor when a pressing plate is closed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image reading apparatus comprising:
a document table on which a document is placed;
a pressing plate configured to rotate about a rotation axis between an open position where the document table is uncovered and a closed position where the document table is covered;
a line sensor including an image sensor arranged in a main scanning direction intersecting the rotation axis and configured to output data by reading the document placed on the document table; and one or more processors configured to:
- calculate threshold data based on first data acquired by the line sensor when the pressing plate is in an intermediate position before reaching the closed position and coefficient data that changes depending on a length from the rotation axis; and
- determine presence or absence of the document based on the threshold data and second data acquired by the line sensor when the pressing plate is in the closed position.

2. The image reading apparatus according to claim 1, wherein the first data and the second data correspond to respective positions for different document sizes in the line sensor.

3. The image reading apparatus according to claim 1, further comprising a detection sensor configured to detect that the pressing plate is in the intermediate position between the open position and the closed position,
wherein the detection sensor detects that the pressing plate is in the closed position.

4. The image reading apparatus according to claim 3, wherein the pressing plate is determined to be in the closed position based on a lapse of a predetermined period of time after the detection sensor detects that the pressing plate is in the intermediate position.

5. The image reading apparatus according to claim 3, wherein the pressing plate is determined to be in the closed position based on a change in data acquired by the line sensor after the detection sensor detects that the pressing plate is in the intermediate position.

6. The image reading apparatus according to claim 5, wherein the change in the data is a change in output of the image sensor located at a position outside an area where the document is placed in the line sensor.

7. The image reading apparatus according to claim 1, wherein the one or more processors determine a size of the document in the main scanning direction from the threshold data and the second data.

8. The image reading apparatus according to claim 1, further comprising a photo sensor configured to determine a size of the document in a sub scanning direction intersecting the main scanning direction.

9. The image reading apparatus according to claim 1, wherein when the pressing plate is in the closed position, the one or more processors correct control unit corrects data acquired by the line sensor while the line sensor is moving.

10. A control method of an image reading apparatus including a document table on which a document is placed, a pressing plate configured to rotate about a rotation axis between an open position where the document table is uncovered and a closed position where the document table is covered, and a line sensor including an image sensor arranged in a main scanning direction intersecting the rotation axis, and configured to output data by reading the document placed on the document table, the control method comprising:
- calculating threshold data based on first data acquired by the line sensor when the pressing plate is in an intermediate position before reaching the closed position and coefficient data that changes depending on a length from the rotation axis; and
- determining presence or absence of the document based on the threshold data and second data acquired by the line sensor when the pressing plate is in the closed position.

11. The image reading apparatus according to claim 1, wherein the coefficient data is smaller as the length from the rotation axis is longer.

12. The image reading apparatus according to claim 1, wherein the coefficient data is set depending on a type of a recording medium used for the document.

* * * * *